June 25, 1968

H. H. BECK 3,390,001

APPARATUS AND METHODS FOR TREATING CHEESE
WITH ANTI-SPOILAGE AGENTS

Filed April 28, 1964

INVENTOR:
HERBERT H. BECK
BY
*Carl C. Batz* ATT'Y

United States Patent Office 3,390,001
Patented June 25, 1968

3,390,001
APPARATUS AND METHODS FOR TREATING
CHEESE WITH ANTI-SPOILAGE AGENTS
Herbert H. Beck, Portage, Wis., assignor to Armour and
Company, Chicago, Ill., a corporation of Delaware
Filed Apr. 28, 1964, Ser. No. 363,160
6 Claims. (Cl. 99—162)

ABSTRACT OF THE DISCLOSURE

In the application of anti-microbial food spoilage powder, such as crystalline sorbic acid, etc., the food material, such as cheese, is passed on an open mesh conveyor through a chamber which is maintained under slight negative pressure. Within the chamber, a suspended baffle divides the chamber into a lower turbulent zone in which the powder is suspended by air jets and into a relatively quiescent zone above the baffle. Air and powder are withdrawn from the quiescent zone to produce the negative pressure and to permit powder within the quiescent zone to settle downwardly into the chamber.

---

This invention relates to apparatus and methods for treating cheese with anti-spoilage agents. The invention is applicable also to the treatment of other bodies and bodies of irregular shapes.

The treatment of cheese with chemical agents in the control of harmful microorganisms, such as mold-forming fungi, bacteria, etc., is an accepted practice in the industry. A number of chemical compounds have been found both effective and safe for this purpose. However, the utilization of such agents and other anti-spoilage agents, so as to obtain an optimum coating of the cheese products with the chemical, has created serious problems. While the utilization of a chemical, such as sorbic acid, for the treatment of processed cheese presents no problem because the chemical may be simply added to the blend of cheese going into the processing kettle and thus distributed throughout the cheese mass, this procedure is not suitable for natural Cheddar, Swiss, and other cheese in consumer-size pieces. Dipping or spraying is not desirable because the added moisture interferes with the wrapping and package sealing. Also, in view of the fissured surfaces of Cheddar and the eyes in Swiss cheese, there is the possibility of excess anti-spoilage material collecting in the fissures and eyes of these products.

When the anti-spoilage chemicals are in the form of dry powder, a further problem is presented because the acrid, highly-irritating powder when employed in the confines of a working room pollutes the air which the employees must breathe. Further, in the application of dry powder to the cheese, there is the difficulty of securing uniform application while avoiding substantial losses during the dusting operation.

A primary object, therefore, of the invention is to provide a means and method for treating cheese pieces or the like with an anti-spoilage powder in such a manner as to obtain uniform application of the powder, while at the same time protecting the processing personnel from contact with the chemical dust. A further object is to provide a method and means for the treatment of cheese and the like to prevent spoilage thereof while utilizing a powdered chemical in a manner to provide effecting coating on all sides of the bodies to be treated. Yet another object is to provide a method and means for the treating of cheese and other bodies, including bodies of irregular shapes, with a powdered chemical in a confined zone in which the powder is suspended uniformly upon the bodies while also maintaining the zone under slight negative pressure. Other specific objects and advantages will appear as the specification proceeds.

Figure 1:
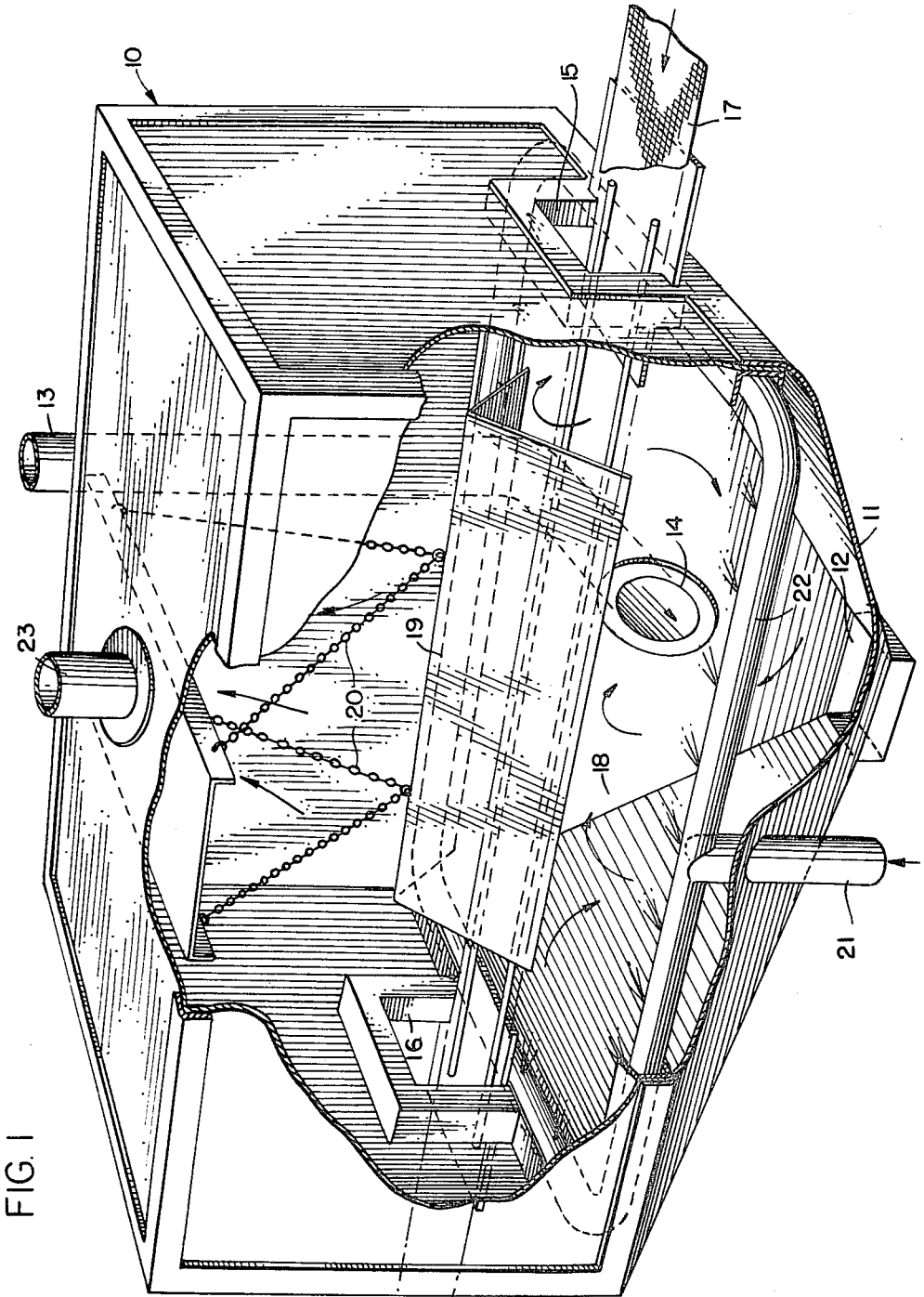
Figure 2:
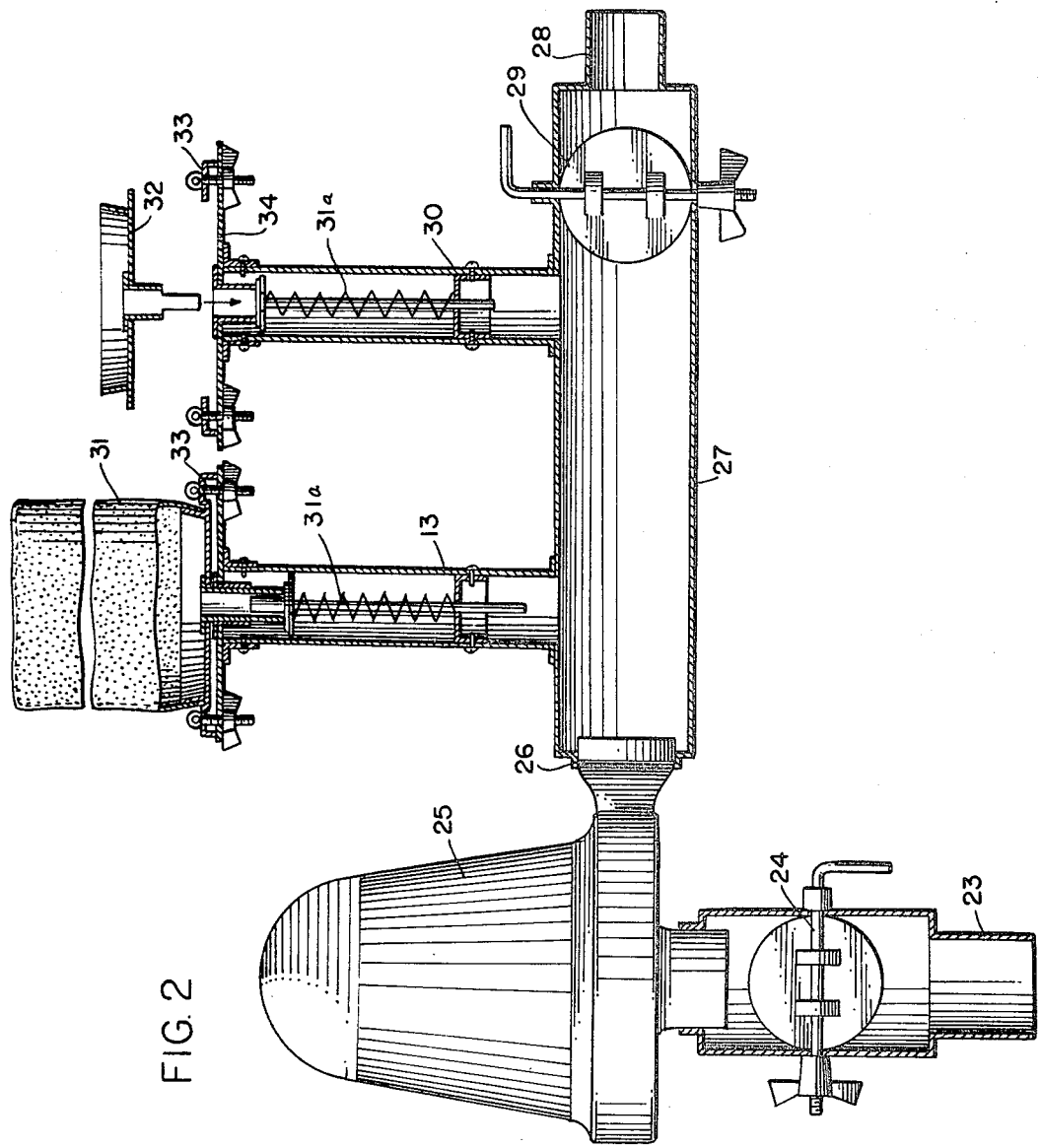

The invention is shown, in an illustrative embodiment, by the accompanying drawings, in which:

FIGURE 1 is a broken perspective view of apparatus embodying my invention and with which my new process may be employed; and FIG. 2, a view on an enlarged scale of suction and filtering apparatus adapted to be employed with the apparatus shown in FIG. 1.

In the apparatus shown in FIG. 1, 10 designates a casing which provides a treating chamber, the bottom wall 11 of the casing being inclined and terminating in a box or container 12 adapted to receive anti-spoilage powder. 13 designates a duct having an opening 14 within the chamber and through which chemical powders may be introduced onto the bottom wall 11 of the casing and into box 12. It will be understood that any suitable means for introducing the powder into the chamber may be employed.

The casing 10 is provided on one side with an opening 15 providing an inlet, and on the opposite side with an outlet 16. An open mesh conveyor 17 is provided for carrying cheese or other objects to be treated through the chamber 18 provided by casing 10.

For agitating the powder within the chamber 18, I provide an inlet pipe 21 communicating with a source of air pressure, which will be later described. The pipe 21 leads into a manifold 22 which extends about the interior of the chamber 18 and is provided with a large number of openings directed downwardly so as to direct the air into the lower portion of the chamber for the agitation of the powder therein. The jets of downwardly-directed air strike the powder in the receptacle 12 and along the side walls of the bottom 11 and create currents of air which suspend the powder throughout the chamber 18. Preferably, some of the jets from the manifold 22 are directed at the cheese, creating active turbulence of the air currents around the cheese bodies.

Extending through the top portion of the casing 10 is a suction tube 23 leading to a source of suction which will be described later in connection with FIG. 2. The suction provided is sufficient to create a slight negative pressure within the upper portion of the chamber 18 so that air will be drawn inwardly through the inlet opening 15 and outlet opening 16, thus preventing escape of powder into the processing room.

A baffle 19 is suspended over the mesh conveyor 17 by means of chains 20 for the purpose of confining the more turbulent air currents to the lower portion of the chamber. The height of the baffle is adjusted to confine the turbulent currents to where they present suspended powder uniformly to all sides of the cheese being carried along on the conveyor. The chamber has substantial height above the baffle 19 where the protection of the baffle allows the air flow to become directed toward the suction tube 23 in sufficiently slow flow to permit suspended powder to settle out. The velocity of withdrawal of powder carrying air is further reduced and guided by the air drawn in at inlet and outlet openings 16 and 15 respectively.

The baffle separates the chamber 18 into two zones: The lower zone where air enters at high velocities which cause it to pick up and suspend powder in swirls of turbulence, and the upper zone where the air is withdrawn in slow quiet flow that permits the powder to settle out. Still another purpose is that the baffle 19 cooperates with the suction pipe 23 in directing the suction primarily toward the inlet and outlet openings so that by utilizing a minimum of suction, escape of powder or chemical dust from the chamber 18 is prevented. The baffle is also a cover which protects the cheese by deflecting the powder dropping from the upper portion of the chamber.

Referring to FIG. 2, which is on an enlarged scale, the pipe 23 represents a continuation of the pipe 23 shown in FIG. 1 and communicates through a butterfly valve 24 with a motor-driven circulating fan or blower 25. The discharge pipe 26 of the fan 25 communicates with a manifold 27 provided with a discharge 28 normally controlled by butterfly valve 29. The discharge pipe 28 is extended to connect with inlet pipe 21, heretofore described, so that the air delivered from the manifold 27 through pipe 28 provides the return air under pressure for discharge through the manifold 22.

Communicating with the manifold 27 are two discharge pipes 30 which open into detachable filter bags 31 which retain the powder in the air being discharged from the system. Butterfly valve 29 controls the amount of air that is discharged through filter bags 31 and the reduced pressure in chamber 18. Butterfly valve 24 controls the amount of air entering chamber 18 and moved by the fan. In operation, the air being discharged through the filter bags 31 is replaced by that added at the cheese conveyor openings 15 and 16 in the chamber.

I prefer to employ two filter structures so that one filter may be changed while the other is in operation. In the specific illustration given, the filter bag is provided with a ring 32 adapted to be secured by the clamping members 33 to a centrally-apertured disk 34 secured to the discharge pipes 30. As a filter bag 31 together with a holder 32 are removed for cleaning or changing filters, the spring 31a closes the passage automatically, thus preventing loss of the powder into the workroom while the filter is being cleaned, etc.

If desired, the powder may be introduced directly into the circulating system provided by pipes 28 and 21 by any suitable means. The powder container 12, instead of being located in the bottom of chamber 18, may be located in the recirculating system outside the dusting chamber, but if located in the system outside of the dusting chamber, the jets must be arranged to direct the powder uniformly on all cheese surfaces.

Instead of employing a single air system as described above, a two-air system may be utilized in which air from a compressor is supplied through pipe 21 to the manifold 22, while the exhausting of air through pipe 23 is controlled by a separate fan or blower 25. In this manner, there is provided a pressure system for operating the jets in manifold 22 for suspending the powder and a separate exhaust system for carrying away the air from the jets together with suspended powder and together with a little extra air drawn in at the cheese conveyor openings 15 and 16.

The two-air system requires all the air flowing in the system to be discharged through the filter bags; whereas the single air system recirculation has the advantage that only the small volume of air entering at openings 15 and 16 in chamber 18 must be filtered with smaller filters and less frequent changing of filters.

*Operation*

In the operation of the apparatus and method, cheese pieces or blocks are placed upon the mesh conveyor 17, which may be a continuous conveyor having a single leg passing through the casing 10, and the cheese bodies are carried thereby through the chamber 18. The treating powder, whether introduced into the circulating system or through conduit 13 into the bottom portion of the chamber 18, is directed into the chamber by the jets to form a turbulent suspension about the bodies being treated. The minute jets form a uniform cloud or suspension of the powder material so that it moves upwardly through the mesh of the conveyor 17 so as to deposit on the bottom side of the bodies, while also depositing on the top side and all sides of the cheese bodies. The cheese body normally carries a moist surface which receives the powder and anchors the powder coating onto the body. With a substantially uniform suspension of the powdered chemical thus maintained about the cheese body, it is found that the cheese can accurately receive the desired depth of coating by controlling the time during which the cheese body passes through the chamber 18. Usually, a travel of the cheese within the chamber is from 5 to 10 seconds, and during this time a coating of sorbic acid, etc., is provided within the range of 0.1 to 0.2 percent. For certain uses, a coating as low as 0.05 percent by weight may be satisfactory.

A slight negative pressure is maintained within the chamber by the suction pipe 23 so that air flows inwardly through the inlet opening 15 and outlet opening 16, while at the same time the baffle 19 is effective in directing the suction toward the area of the inlets and outlets. Further, the baffle maintains the rising column of air currents bearing the powdered chemical about the conveyor 17 and the cheese blocks thereon. The withdrawn air and chemical through pipe 23 are discharged through one of the filter bags 31 from which the powder may be recovered and reused. In the single air system, butterfly valve 29 permits a portion of the air to be recirculated through pipe 28 communicating with pipe 13 for reuse in the chamber 18. If a two-air system is employed, normally very little air, if any, will be released through outlet 28, and the incoming compressed air will be supplied to pipe 21 from a separate air compressor source.

The powdered chemical may be any anti-microbial food spoilage agent, such as, for example, crystalline sorbic acid, salts of sorbic acid, metal salts of propionic acid, sodium and potassium propionates, hydroxy esters of benzoic acid, etc. Since such anti-microbial food spoilage agents are well known, further detailed examples are believed unnecessary.

In the operation of the process described, the loose powder or chemical dust within the bottom of the container is agitated and stirred by fine jets of air to produce a cloud or uniform suspension of the powder so that it may settle out of the way onto the cheese body surfaces. Alternatively, the incoming compressed air may, if desired, be charged with the powder outside of the chamber 18, and the compressed air jets bearing the powder may be impinged directly upon the cheese bodies to form a deposit thereon, and in such alternate procedure, the jets may be impinged upon all sides of the cheese body. The cheese blocks would be carried through the treating chamber by a mesh conveyor and the chamber would be preferably maintained under slight negative pressure.

While in the foregoing specification I have set forth certain structures and certain steps in considerable detail for the purpose of illustrating embodiments of the invention, it will be understood that such detail or details may be varied widely by those skilled in the art without departing from the spirit of my invention.

I claim:

1. In apparatus for directing powder upon bodies, a casing providing a treating chamber having an inlet and an outlet, an open mesh conveyor for advancing said bodies through the inlet and outlet of said casing, means for supplying powder in the lower portion of said casing, means for introducing air jets into the lower portion of said casing for agitating and suspending said powder, a baffle supported above said conveyor within said casing to confine powder-bearing air currents about said conveyor, and a suction withdrawal conduit communicating with the upper portion of said casing above said baffle.

2. The apparatus of claim 1 in which said baffle is supported centrally within said chamber spaced from the inlet and outlet of said casing.

3. The structure of claim 1 in which the lower portion of said casing has inclined walls providing a powder-receiving chamber.

4. In apparatus for applying dry powder upon bodies, a casing providing a treating chamber and having an inlet and an outlet, an open mesh conveyor for advancing said bodies through the inlet and outlet of said casing, means for supplying powder to the lower portion of said casing, means for introducing air jets into the lower portion of said casing for agitating and suspending said powder, and a baffle having downwardly-inclined sides suspended above said conveyor within said casing and adapted to confine powder-bearing air currents about said conveyor.

5. The structure of claim 4 in which suction means communicate with the housing above said baffle for withdrawing air-bearing powder to maintain said chamber under negative pressure, means for collecting the withdrawn powder, and a recirculating conduit for returning said separated powder to the lower portion of said treating chamber.

6. In a process for treating cheese bodies to inhibit mold thereon, the steps of maintaining a partially divided treating zone composed of a turbulent portion and a quiescent portion under slight negative pressure, passing the cheese bodies continuously through said turbulent portion, continuously introducing into said zone a dry mold-inhibiting powder, agitating said powder with air jets to suspend the powder in air currents about said cheese bodies for the deposition of powder upon all surfaces of said bodies, and continuously withdrawing air and powder from said quiescent portion.

References Cited

UNITED STATES PATENTS

| | | | |
|---|---|---|---|
| 2,119,910 | 6/1938 | Ferry | 118—308 X |
| 2,865,764 | 12/1958 | Gorisca et al. | 99—162 X |
| 2,907,299 | 10/1959 | Weinet | 118—309 |
| 3,036,533 | 5/1962 | Burt et al. | 118—309 X |
| 3,328,176 | 6/1967 | Hansen et al. | 99—162 |

ALVIN E. TANENHOLTZ, *Primary Examiner.*

A. LOUIS MONACELL, HYMAN LORD, *Examiners.*

D. M. NAFF, *Assistant Examiner.*